(12) United States Patent
Lafky

(10) Patent No.: US 6,809,830 B1
(45) Date of Patent: Oct. 26, 2004

(54) METHOD AND SYSTEM FOR ENABLING A PRINTING PROGRAM TO COMMUNICATE WITH A PRINTER

(75) Inventor: Joby S. Lafky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/323,313

(22) Filed: Jun. 1, 1999

(51) Int. Cl.[7] .......................... G06F 15/00; G06K 1/00
(52) U.S. Cl. .................. 358/1.13; 358/1.13; 358/1.15; 710/100; 710/104; 710/300; 710/301; 710/302; 710/303; 710/304; 710/305
(58) Field of Search ............................. 358/1.13, 1.15; 710/104, 100, 300, 301, 302, 303, 304, 305

(56) References Cited

U.S. PATENT DOCUMENTS

| 5,692,111 A | * | 11/1997 | Marbry et al. ............. 358/1.15 |
| 5,727,135 A | * | 3/1998 | Webb et al. ................ 358/1.14 |
| 5,768,583 A | * | 6/1998 | Orzol et al. .................... 713/1 |
| 5,819,112 A | * | 10/1998 | Kusters ....................... 710/36 |
| 5,835,737 A | * | 11/1998 | Sand et al. ................. 710/113 |
| 5,991,830 A | * | 11/1999 | Beard et al. .................. 710/18 |
| 6,151,134 A | * | 11/2000 | Deppa et al. ............... 358/1.15 |
| 6,195,723 B1 | * | 2/2001 | Neal et al. .................. 710/313 |
| 6,301,012 B1 | * | 10/2001 | White et al. ............... 358/1.15 |
| 6,310,692 B1 | * | 10/2001 | Fan et al. .................. 358/1.14 |
| 6,477,548 B1 | * | 11/2002 | Nihei ......................... 707/204 |

OTHER PUBLICATIONS

Viscarola, P. and Mason, W.A. *Windows NT® Device Driver Development*, pp. 167–209. OSR Open Systems Resources Inc., 1999.

* cited by examiner

*Primary Examiner*—Kimberly Williams
*Assistant Examiner*—Ashanti Ghee
(74) *Attorney, Agent, or Firm*—Leydig, Voit & Mayer Ltd.

(57) ABSTRACT

A method and system for enabling a printing program to communicate with a printer relies on a plug and play manager to detect the presence of a printer and send a notification message to the printing program when a device driver registers a new device in the operating system registry. In response to the message, the printing program calls a function in a dynamic port monitor that retrieves the new device registration information from the operating system registry. The dynamic port monitor then creates a port name for the printer and associates it with the physical printer port. The dynamic port monitor also periodically determines whether any excess ports need to be deleted.

35 Claims, 6 Drawing Sheets

METHOD AND SYSTEM FOR ENABLING A PRINTING PROGRAM TO COMMUNICATE WITH A PRINTER

TECHNICAL FIELD

The invention relates generally to printer communications and, more particularly, to a method and system for enabling a printing program to communicate with a printer.

BACKGROUND OF THE INVENTION

Plug and Play is a well-known technology that enables a computer, using the right combination of hardware and software, to configure a newly installed device (such as a printer, modem or a disk drive) with little or no intervention by the user. When a device designed for Plug and Play is installed on a Plug and Play-enabled computer system, the device automatically alerts the computer system to its presence and informs the computer of its communications needs. Based on this communication, the computer's operating system selects the appropriate driver for the device. The Plug and Play computer system can then allocate the appropriate communications resources to the new device and thereby avoids conflicts with previously installed devices. This technology is designed to make computers more user-friendly to novices who may not understand how to choose interrupt settings, direct-memory access channels, or port assignments.

The MICROSOFT WINDOWS family of operating systems have supported Plug and Play technology since the introduction of the WINDOWS 95 brand operating system. However, the automatic detection of a newly added Plug and Play printer on a computer running the WINDOWS NT brand operating system only occurs when the computer is booting up, or during a user-initiated setup procedure. Thus, a need exists for informing the WINDOWS NT brand operating system of a new printer as soon as it is attached.

Furthermore, the printing program presently used in connection with the WINDOWS NT brand operating system, also known as SPOOLER, is designed to communicate with explicitly-named ports, and requires a static, one-to-one correspondence between a logical port name (a text name, such as "LPT1") and a physical port (such as the parallel port). To facilitate this communication, a port monitor is required to create a data path between the printing program and a kernel-mode device driver. However, port monitors are architecture-specific and thus, for every method of connecting a printer to a computer (e.g. IEEE-1394, PCI, parallel) printer manufacturers have to create a different port monitor. Accordingly, a need exists for allowing the printer, through its device driver, to signal its needs to a generic port monitor, thereby eliminating the need for architecture-specific port monitors.

SUMMARY OF THE INVENTION

In accordance with these needs, the present invention is generally realized in a user-mode dynamic port monitor that provides an architecture-independent data path between a printing program and a kernel-mode device driver. The kernel-mode device driver informs a Plug and Play manager of the attributes of the a newly installed printer by registering a printer device object in a designated portion of the operating system registry. The printing program receives notification from the Plug and Play manager whenever there is a change to the list of device objects within the designated portion of the registry and then reacts by making a function call to the dynamic port monitor. In response, the dynamic port monitor uses a conventional "Setup" Application Programming Interface (API) to access the registry and obtain this device object. The device object contains the information required by the dynamic port monitor to created a communications path from the printing program to the kernel-mode device driver, and ultimately the printer.

DETAILED DESCRIPTION OF THE INVENTION

Figure 1:
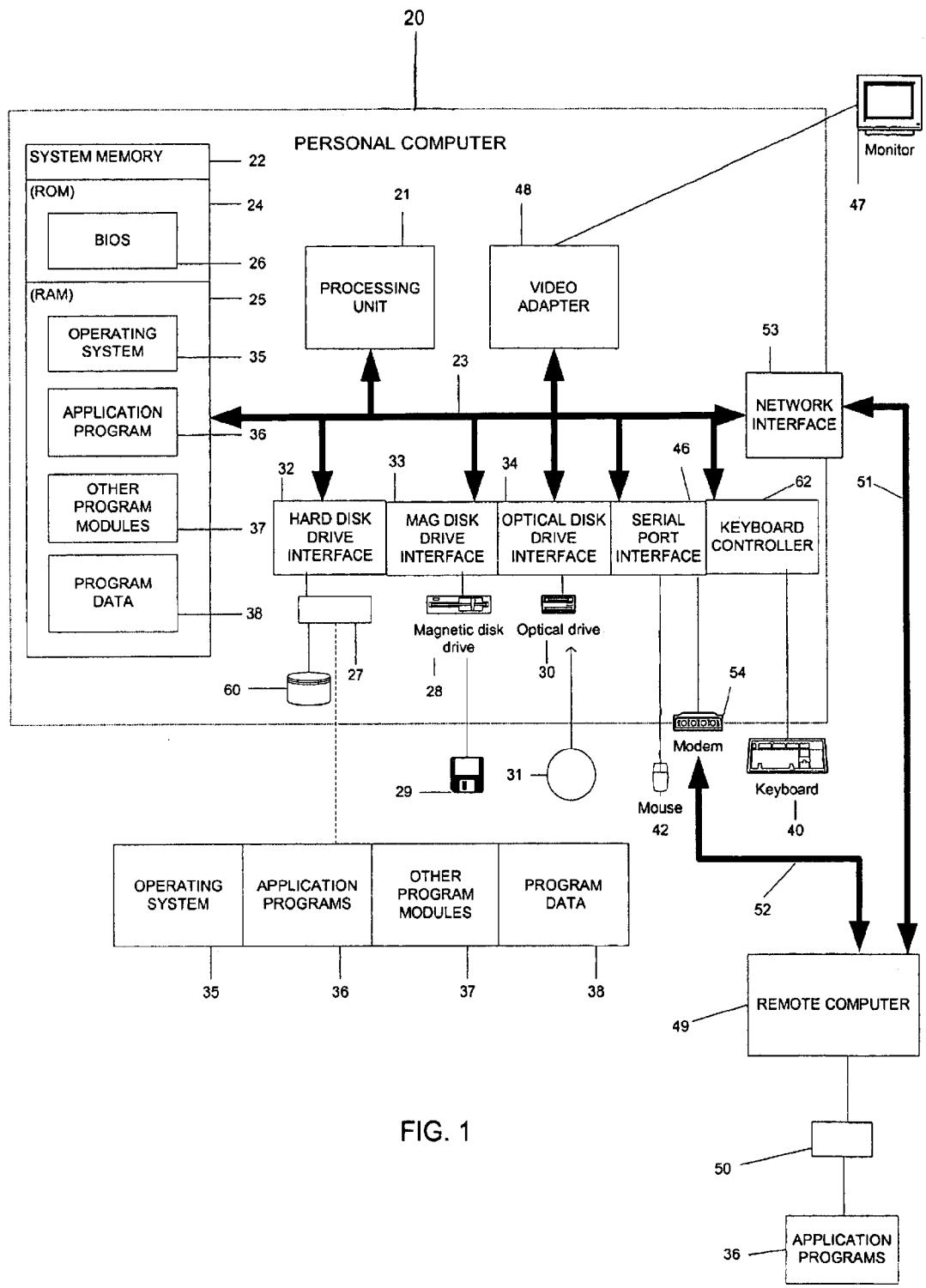
FIG. 1 is a block diagram illustrating an exemplary LAN or WAN computer system on which the present invention can reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, main-frame computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in the ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40, which is typically connected to the personal computer 20 via a keyboard controller 62, and a pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1.

The logical connections depicted in FIG. 1 include a local area network (LAN) 51 and a wide area network (WAN) 52. Such networking environments are commonplace in offices, enterprise-wide computer networks, intranets and the Internet. It will be appreciated that the network connections shown are exemplary and other means of establishing a communications link between the computers may be used. When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device 50.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
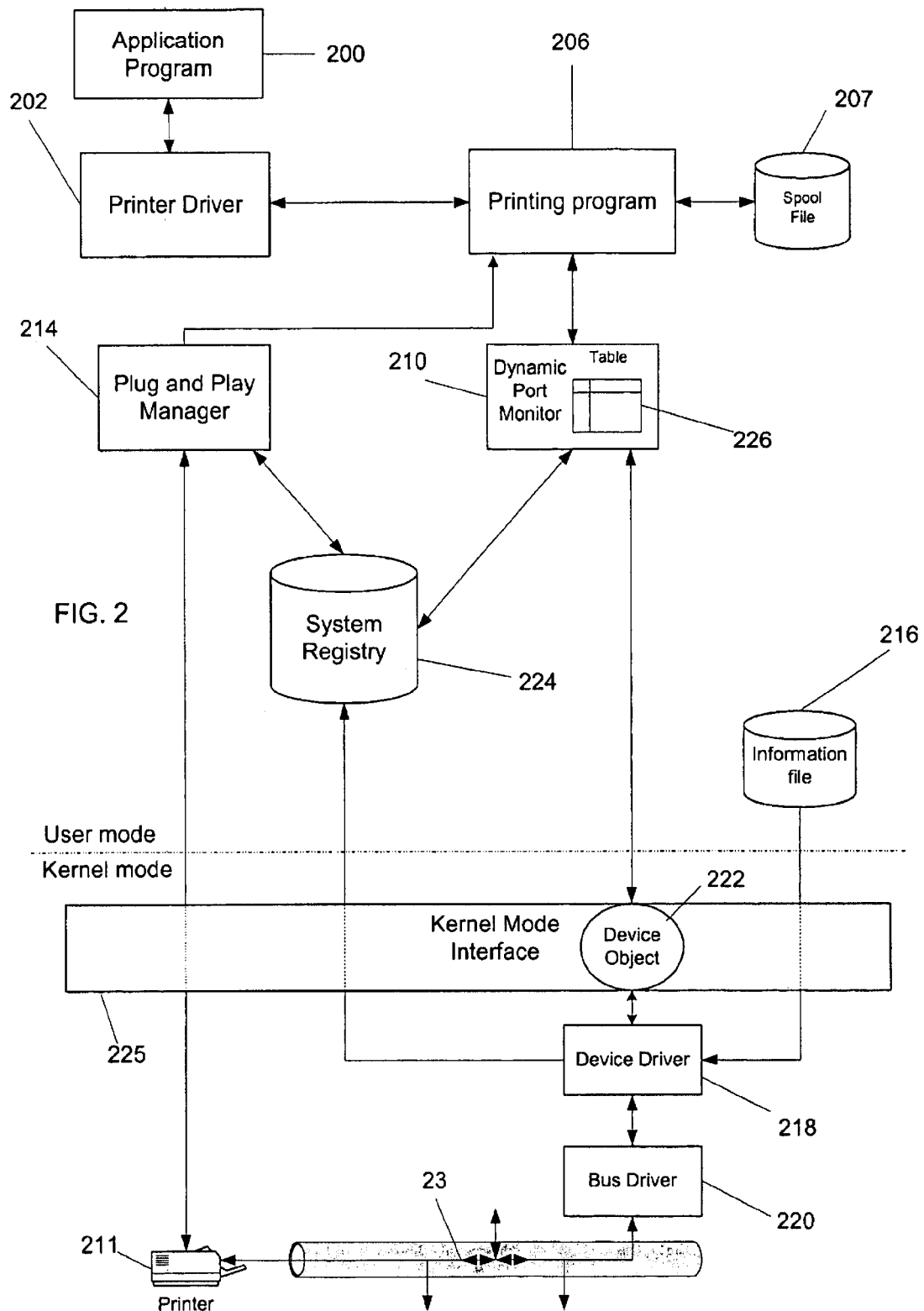
FIG. 2 is a block diagram illustrating the overall flow of data according to the present invention.

Turning to FIG. 2, the components that comprise an exemplary embodiment of the system for enabling a printing program to communication with a printer are illustrated. These components may be stored on the hard disk 60 or other semipermanent storage medium while not in use, but are generally loaded into the RAM 25 when executing. As will be understood by those skilled in the art, the components may be distributed among several computers of a network. As illustrated, the system includes an application program 200 that can be any user-mode program utilizing print services. The application program 200 is in communication with a printer driver 202 that translates print requests from the application program 200 into a format recognizable by a particular model of printer. The printer driver 202, is, in turn, in communication with a printing program 206 that manages most printing functions for the personal computer 20, such as the initial loading of the printer driver 202, converting high level print functions into raw printer data, and storing the raw printer data in a spool file 207.

The system further includes a Plug and Play manager 214 that uses conventional Plug and Play technology to send and receive configuration information to and from a printer 211 and the system bus 23. Such information includes hardware identification, interrupt requirements, and message formats. For acting as the operational interface between the printer 211 and the personal computer 20, the kernel mode components of FIG. 2 include a device driver 218. The device driver 218 is also responsible for initializing any printer that is attached to the system bus 23 in accordance with a set of parameters contained in an information file 206. For managing the flow of data between the personal computer 20 and the devices attached to the system bus 23 (including the printer 211), the kernel-mode components also include a bus driver 220. The various components of FIG. 2 communicate via a conventional Application Programming Interface (API) and through a kernel-mode interface 225. The system also includes a registry 224, a device object 222, and a dynamic port monitor 210 which will be discussed in greater detail in conjunction with FIGS. 4–6.

Figure 3:
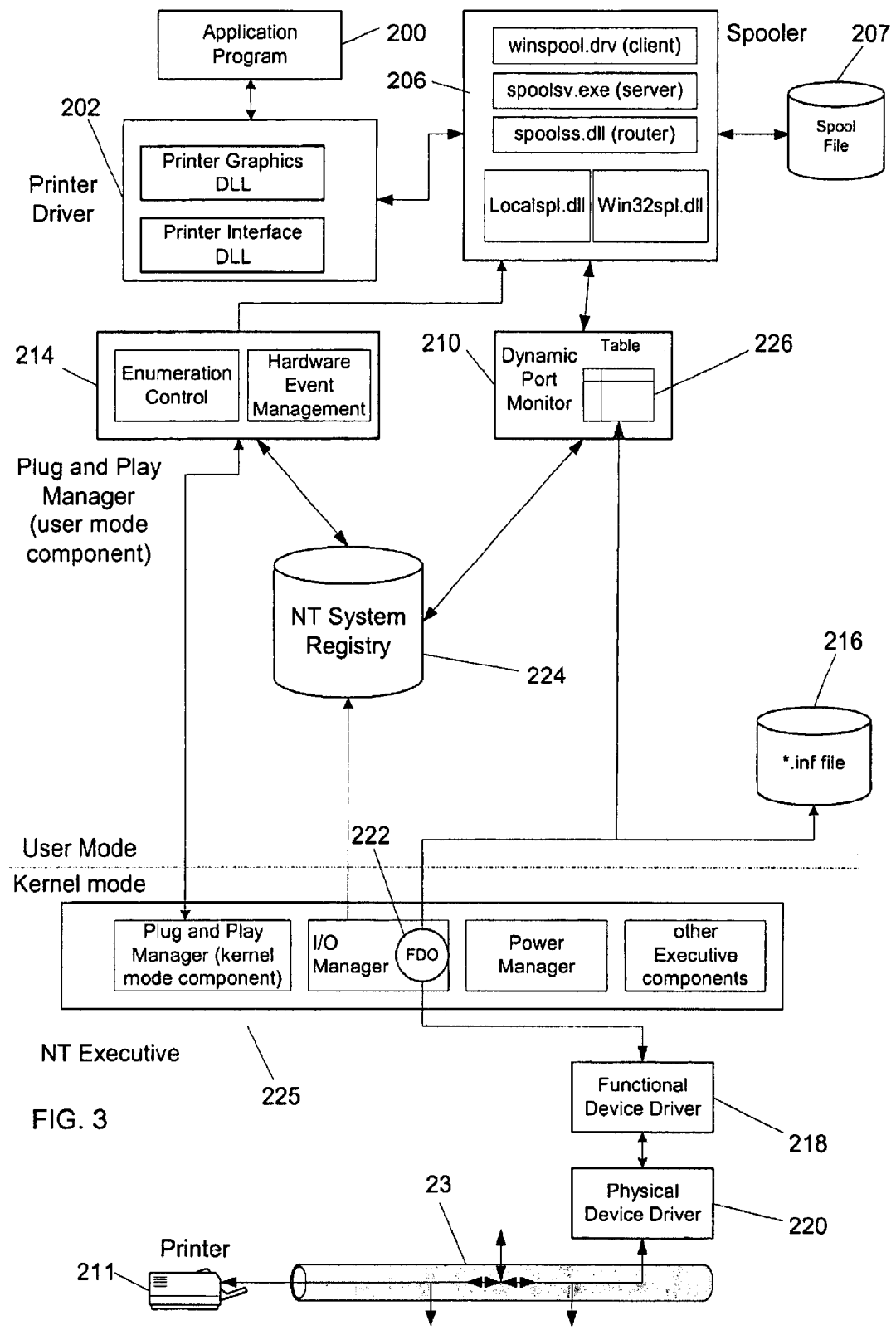
FIG. 3 is a block diagram illustrating the architecture of a preferred embodiment of the invention implemented on the WINDOWS NT brand operating system.

When implemented on the WINDOWS NT or WINDOWS 2000 brand operating systems (collectively referred to hereinafter as WINDOWS NT), the components of FIG. 2 have the more specific structure shown in FIG. 3. The printing program 206 is the user mode portion of the WINDOWS NT brand operating system SPOOLER program and includes the files winspool.drv, spoolsv.exe, spoolss.dll, localspl.dll, and Win32spl.dll. The kernel mode interface 225 is the WINDOWS NT brand operating system EXECUTIVE layer, which contains an I/O MANAGER that allows communication between user mode and kernel mode components and is described on pages 167–209 of *Windows NT® Device Driver Development*, Copyright 1999 by Peter G. Viscarola and W. Anthony Mason, published by OSR Open Systems Resources Inc. which is incorporated herein by reference in its entirety. The device driver 218 and bus driver 220 can be implemented as a FUNCTIONAL DEVICE DRVER and a PHYSICAL DEVICE DRIVER respectively. The user mode components may communicate with kernel mode or other user mode components using a variety of mechanisms, including the well-known WINDOWS NT brand operating system WIN32 API. The kernel mode components may communicate with user mode or other kernel mode components using the well known WINDOWS DRIVER MODEL (WDM) of the WINDOWS NT brand operating system.

Figure 4:
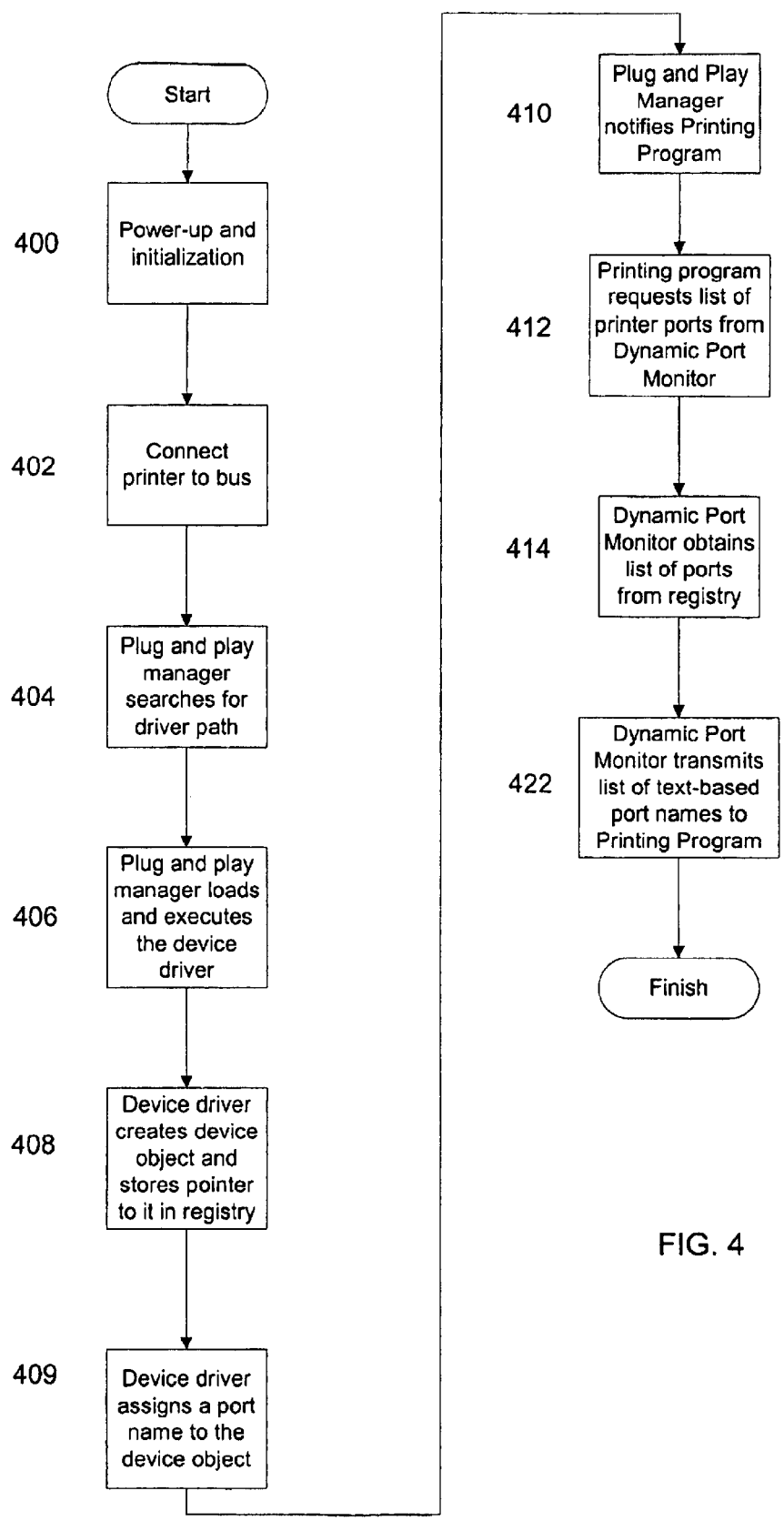
FIG. 4 is a flowchart generally depicting the steps for installing a printer in accordance with the present invention.

Turning to the flowchart of FIG. 4, an exemplary process of installing the printer 211 is depicted. At step 400, the computer 20 is turned on and initialized. During the initialization process, the printing program 206 uses a standard API to request that a notification message be sent by the Plug and Play manager 214 whenever a new printer has been added to the system bus 23 of the personal computer 20. When implemented on the WINDOWS NT brand operating system, the API call used is RegisterDeviceNotification, in which the Plug and Play manager 214 signals the addition of a printer by generating a message called "WM_DEVICECHANGE" over the WIN32 API.

At step 402, the printer 211 is plugged into the bus 23. Using a conventional Plug and Play technique, the system bus 23 sends a "new device" message to the Plug and Play manager 214. The message contains a code that correspond to characteristics of the new device (in this case the printer 211). These characteristics include the class of the device and the type of bus it uses. For example, using one Plug and Play implementation, the device class is "7," indicating that the new device is a printer. At step 404, the Plug and Play manager 214 searches the information file 216 until it finds an entry containing the code. The entry also contains the name and installation instructions for the device driver 218 for that type of printer. The Plug and Play manager 214 then loads and executes the device driver at step 406. When implemented on the WINDOWS NT brand operating system, the information file is a standard *.inf file.

At step 408, the device driver 218 creates the device object 222 for the printer 211. The device object 222 is a data structure containing configuration information for the printer 211. Using a conventional API call, the device driver 218 then registers the device object 222 by storing a pointer to it in the operating system registry 224. The operating system registry 224 is a well-known database that contains values describing the current state of the personal computer 20. When implemented on the WINDOWS NT brand operating system, the device object 222 is a well-known Functional Device Object (FDO) registered under a 64-bit Globally Unique ID (GUID) using the IoRegisterDeviceInterface function of the WDM.

At step 409, the device driver 218 assigns a port name to the device object and stores the port name in the system registry 224. There are many possible schemes for assigning names to the devices objects, however, in a preferred embodiment, the device driver 218 takes a descriptive root and appends a number to it according to the order in which the printer is added. For example, if the printer 210 is a USB printer, then the device driver 218 may list the device object in the operating system registry as "USB"+the GUID for printers and then enumerate the device object as "USB_001." The next listing of a dynamic USB printer may then receive the name "USB_002," and so on.

Once the device object 222 is registered, the Plug and Play manager 214 sends a notification message to the printing program 206 at step 410 indicating that the list of printers stored in the designated section of the operating system registry 224 has been changed.

In response to the message, the printing program 206 calls the dynamic port monitor 210 at step 412, requesting a list of all printer ports for which the dynamic port monitor 210 is responsible. On the WINDOWS NT brand operating system, this is accomplished using a well-known "ENUMPORTS" function of the dynamic port monitor 210. At step 414, the dynamic port monitor 210 calls a conventional API to obtain a list of the port names assigned by the device driver 218 at step 409 from the operating system registry 224. When implemented in connection with the WINDOWS NT brand operating system, the API call is SetupDiEnumDeviceInterfaces. The dynamic port monitor 210 then stores the assignments as a table 226. At step 422, the dynamic port monitor 210 transmits the enumerated list of printers to the printing program 206. The printing program 206 can now communicate with the printer 211 using its assigned port name.

Figure 5:
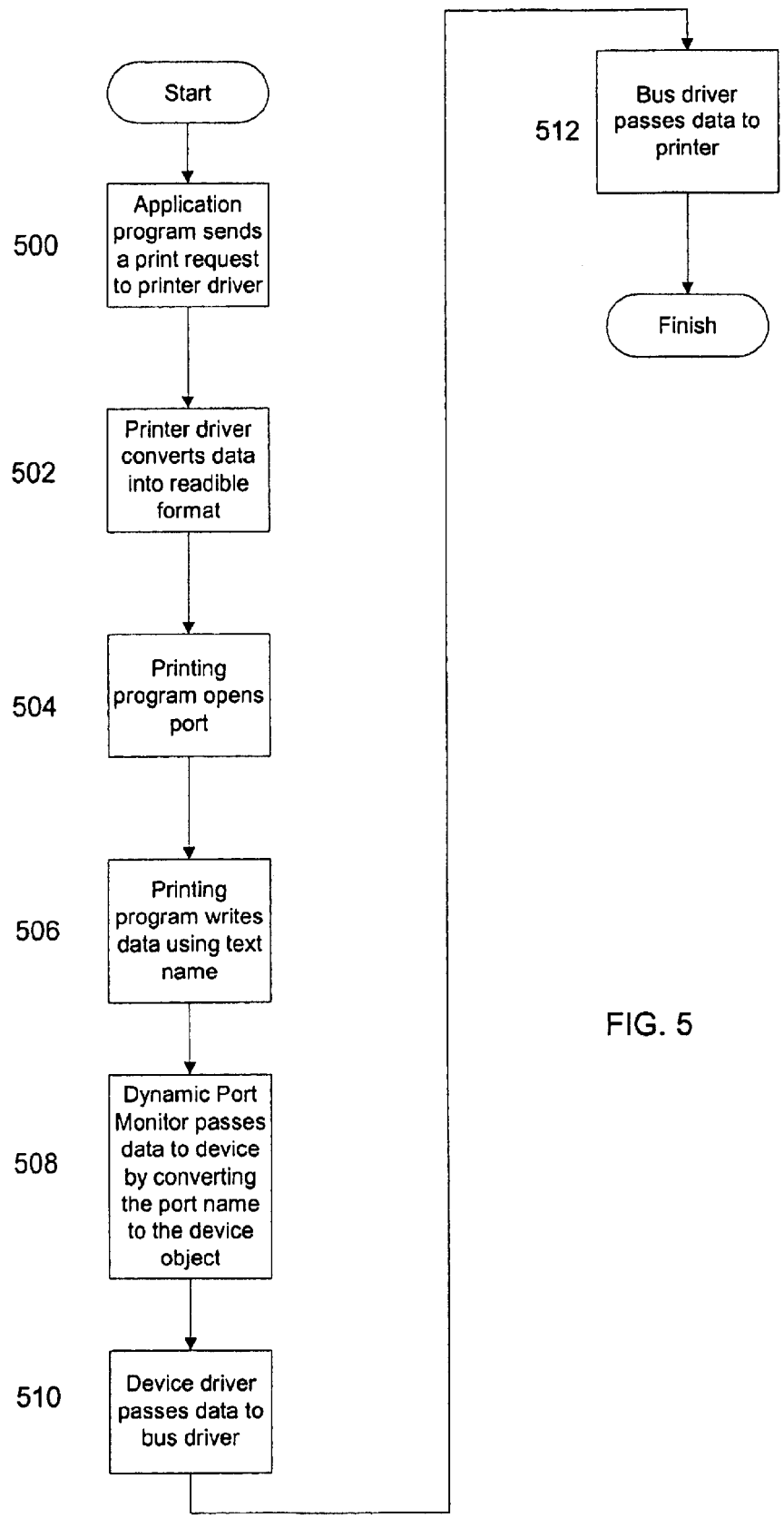
FIG. 5 is a flowchart generally depicting the steps for writing to a printer in accordance with the present invention.

The flowchart of FIG. 5 depicts an exemplary process for sending a print job to the printer 211. At step 500, the application program 200 conventionally sends a print request and the data to be printed to the printer driver 202. At step 502, the printer driver 202 conventionally converts the data into a format readable by the printer 211 and sends it to the printing program 212. The printing program 212 then opens the port associated with the printer 211 using the port name transmitted to the printing program 212 from the dynamic port monitor 210 at step 504. At step 506, the printing program 212 writes the data to be printed to the dynamic port monitor 210, also by referencing the port name. When implemented on the WINDOWS NT brand operating system, steps 504 and 506 are accomplished using the well-known "OPENPORT" and "WRITEPORT" functions contained in the printing program 212, respectively. Since the dynamic port monitor 210 is responsible for that port, the print data will be transmitted to it.

At step 508, the dynamic port monitor 210 receives the print data and passes the print data to the device driver 206 by accessing the table 226 to convert the port name to the device object 222 and sending the print data to the device object 222. The device object 222 acts as an interface between the user mode dynamic port monitor 210 and the kernel mode device driver 206. The device driver 206 then conventionally sends the print data to the bus driver 208, which in turn transmits the data to the printer 211 in steps 510 and 512 respectively.

The process of reading from the printer 211 (for the purpose of checking its status, for example) follows the steps of 504–512, except that in step 506, the printing program 212 reads the port associated with the printer 211, and in all of the following steps, data travels from the printer 211 to the printing program 212 using the same path as the write procedure. When implemented on the WINDOWS NT brand operating system, step 406 is accomplished using the well-known "READPORT" function contained in the printing program 212.

For keeping the overhead associated with the table 226 to a minimum, the dynamic port monitor 210 may manage the table 226 to keep it as small as required. The dynamic port monitor 210 accomplishes this by periodically comparing a list of "print queues" with the list of named ports as well as with the list of registered device objects 222. A "print queue" is a logical representation of a destination to which the printing program 212 can send print jobs. A print queue may correspond to one printer, or it may represent several printers, any of which may be used for output of the print job, depending on which one is currently available. Print queues may be created automatically as a Plug and Play enabled printer arrives, or can be created manually at the request of a user. When the invention is implemented on the WINDOWS NT brand operating system, a print queue can be created using the well-known "ADDPRINTER" function. ADDPRINTER creates a pointer to a data structure containing configuration as well as state information about the print queue. The data structure also lists which ports are associated with the print queue. A reference to the data structure can then be placed in the operating system registry 224 using the conventional "SETPRINTERDATA" function.

Figure 6:
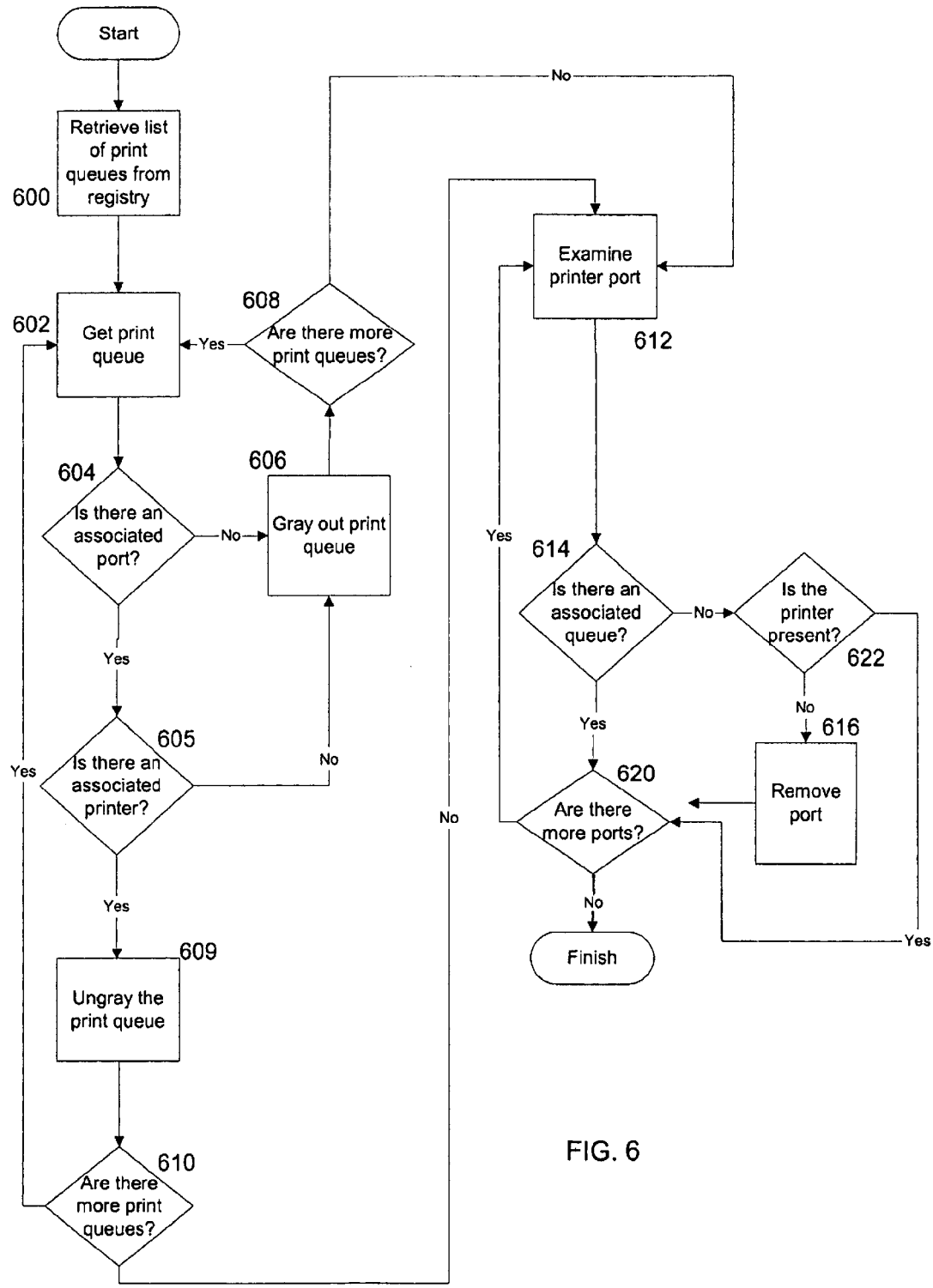
FIG. 6 is a flowchart generally depicting the steps for updating a list of named printer ports in accordance with the present invention.

An exemplary procedure for managing the table 226 is depicted in FIG. 6. At step 600, the dynamic port monitor 210 retrieves a list of the currently registered "print queues" from the operating system registry 224. When implemented on the WINDOWS NT brand operating system, the dynamic port monitor 210 performs this step using the well-known "ENUMPRINTERS" function. The dynamic port monitor 210 then compares the list of printer queues with the list of device objects 222 (each of which represents a currently attached printer). At steps 602–610, the dynamic port monitor 210 determines whether there are any printer queues without corresponding printers. If there are, then the dynamic port monitor 210 conventionally grays out those queues in the user interface. Furthermore, any "grayed-out" print queues that have at least one corresponding port and printer are "ungrayed."

At steps 612–620, the dynamic port monitor 210 locates and deletes printer port entries in the table 226 in which the listed ports have neither an associated printer queue nor an associated printer. The dynamic port monitor 210 also removes references to such ports from the operating system registry 224.

As demonstrated in the foregoing description, the described system enables a printing program, such as the WINDOWS NT brand operating system SPOOLER to receive notification as soon as a printer is added to a computer using a conventional plug and play API, thereby avoiding the need to reboot the operating system. By relying on a dynamic print monitor that uses a conventional Setup API to extract the configuration information for each new printer from the operating system registry, the system also eliminates the need for printer vendors to write new user-mode port monitors every time a new method of attaching printers to a computer is developed. Finally, by comparing the list of user-defined print queues with the list of printer ports, the system has the capability to automatically remove associations between logical port names and physical ports whenever a port is found not to have an associated print queue.

In view of the many possible embodiments to which the principals of this invention may be applied, it should be recognized that the embodiment described herein with respect to the drawing figures is meant to be illustrative only and should not be taken as limiting the scope of the invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method of updating connections between a computer and its peripherals comprising: updating a database with configuration information about a peripheral in response to the peripheral attaching to a port of the computer; associating a name with the port based on the configuration information in order to establish a communication path between the peripheral and a program executing on the computer by referencing the name; automatically removing the association of the port and the name when the peripheral is detached from the computer, thereby maintaining up-to-date information describing the connections between the peripheral and the computer; comparing a list of printer queues with a list of port names generated according to the associating step: and on a user interface, designating printer queues that do not have assigned port names.

2. The method of claim 1 wherein the database is an operating system registry.

3. The method of claim 1, wherein the updating step is performed using a setup application programming interface.

4. The method of claim 1, wherein the name is a text name.

5. The method of claim 1, further comprising the step of sending a message to the program when the database is updated.

6. The met hod of claim 5, wherein the updating step further comprises the step of, in response to receiving the message, causing a port monitor to retrieve the configuration information.

7. A method of updating connections between a computer and its peripherals comprising: updating, a database with configuration information about a peripheral in response to the peripheral attaching to a port of the computer; associating a name with the port based on the configuration information in order to establish a communication path between the peripheral and a program executing on the computer by referencing the name; automatically removing the association of the port and the name when the peripheral is detached from the computer thereby maintaining up-to-date information describing the connections between the peripheral and the computer; comparing a list of queues with a list of port names generated according to the associating step; and deleting the port names that do not have assigned queues.

8. A method of updating connections between a computer and its peripherals comprising: updating a database with configuration information about a peripheral in response to the peripheral attaching to a port of the computer; associating a name with the port based on the configuration information in order to establish a communication path between the peripheral and a program executing on the computer by referencing the name: automatically removing the association of the port and the name when the peripheral is detached from the computer, thereby maintaining up-to-date information describing the connections between the peripheral and the computer; comparing a list of queues with a list of peripherals capable of communicating with the program; and, on a user interface, designating queues that do not have assigned peripherals.

9. A system for creating an interface between a printing program running on a computer and a printer comprising: a plug and play program that detects an installation of the printer on the system and responds by generating a notification message; a device driver capable of communicating with the printer, wherein the device driver stores configuration information about the printer in a database in response to the notification message; a port monitor that retrieves the stored configuration information from the database, wherein the configuration information allows the port monitor to communicate with the device driver, the port monitor including a table having data representative of an association between a physical printer port and a name, the table being created from the configuration information, thereby creating the interface.

10. The system of claim 9, wherein the database is an operating system registry.

11. The system of claim 9, wherein the printing program receives the notification message and responds by causing the port monitor to retrieve the configuration information.

12. A computer-readable medium having computer-executable instructions for performing steps comprising: updating a database with configuration information about a peripheral in response to the peripheral attaching to a port; associating a name with the port based on the configuration information in order to establish a communication path between the peripheral and a program executing on the computer by referencing the name; automatically removing the association of the port and the name when the peripheral is detached from the computer, thereby maintaining up-todate information describing the connection between the peripheral and the computer: comparing a list of queues with a list of port names generated according to the associating step; and on a user interface, designating queues that do not have assigned port names.

13. The computer-readable medium of claim 12, wherein the database is an operating system registry.

14. The computer-readable medium of claim 12, wherein the retrieving step is performed using a setup application programming interface.

15. The computer-readable medium of claim 12, wherein the name is a text name.

16. The computer-readable medium of claim 12, having further computer-executable instructions for performing the step of sending a message to the program when the database is updated.

17. The computer-readable medium of claim 16, having further computer-executable instructions for performing the step of, in response to receiving the message, causing a port monitor to retrieve the configuration information.

18. A computer-readable medium having computer-executable instructions for performing steps comprising: updating a database with configuration information about a peripheral in response to the peripheral attaching to a port; associating a name with the port based on the configuration information in order to establish a communication path between the peripheral and a program executing on the computer by referencing the name; automatically removing the association of the port and the name when the peripheral is detached from the computer, thereby maintaining up-to-date information describing the connection between the peripheral and the computer: comparing a list of queues with a list of port names generated according to the associating step; and deleting the port names that do not have assigned queues.

19. A computer-readable medium having computer-executable instructions for performing steps comprising: updating a database with configuration information about a peripheral in response to the peripheral attaching to a port; associating a name with the port based on the configuration information in order to establish a communications path between the peripheral and a program executing on the computer by referencing the name, automatically removing the association of the port and the name when the peripheral is detached from the computer, thereby maintaining up-to-date information describing the connection between the peripheral and the computer, comparing a list of queues with a list of peripherals capable of communicating with the program; and on a user interface, designating queues that do not have assigned peripherals.

20. A method of enabling a printing program to communicate with a printer comprising the steps of: updating a database with configuration information about the printer in response to the printer being attached to a port; retrieving the configuration information in response to the database update; associating a name with the port based on the retrieved configuration information, wherein the printing program can communicate with the printer by referencing the name; comparing a list of queues with a list of port names generated according to the associating step; and deleting port names that do not have assigned queues.

21. A computer-readable medium having computer-executable instructions for performing steps comprising: updating a database with configuration information about the printer in response to the printer being attached to a port; retrieving the configuration information in response to the database update; associating a name with the port based on the retrieved configuration information, wherein the printing program can communicate with the printer by referencing the name; comparing a list of printer queues with a list of port names generated according to the associating step; and deleting port names that do not have assigned printer queues.

22. The method of claim 8 wherein the database is an operating system registry.

23. The method of claim 8, wherein the updating step is performed using a setup application programming interface.

24. The method of claim 8, wherein the name is a text name.

25. The method of claim 8, further comprising the step of sending a message to the program when the database is updated.

26. The method of claim 25, wherein the updating step further comprises the step of, in response to receiving the message, causing a port monitor to retrieve the configuration information.

27. The method of claim 20, wherein the database is an operating system registry.

28. The method of claim 20, wherein the updating step is performed using a setup application programming interface.

29. The method of claim 20, wherein the name is a text name.

30. The method of claim 20, further comprising the step of sending a message to the program when the database is updated.

31. The method of claim 1 wherein designating comprises marking printer queues that have assigned port names.

32. The method of claim 8 wherein designating comprises marking queues that have assigned peripherals.

33. The computer-readable medium of claim 12 wherein designating comprises marking queues that have assigned port names.

34. The computer-readable medium of claim 19 wherein designating comprises marking queues that have assigned peripherals.

35. The method of claim 34, wherein the up dating step further comprises the step of, in response to receiving the message, causing a port monitor to retrieve the configuration information.

* * * * *